(12) United States Patent
Sokolowski et al.

(10) Patent No.: US 10,753,057 B1
(45) Date of Patent: Aug. 25, 2020

(54) BOTTOM BOOM

(71) Applicants: Kenny Carter Sokolowski, Black Hawk, CO (US); David Anton Carter, Kaneohe, HI (US)

(72) Inventors: Kenny Carter Sokolowski, Black Hawk, CO (US); David Anton Carter, Kaneohe, HI (US)

( * ) Notice: Subject to any disclaimer, the term of this patent is extended or adjusted under 35 U.S.C. 154(b) by 0 days.

(21) Appl. No.: 16/382,170

(22) Filed: Apr. 11, 2019

(51) Int. Cl.
*E02B 3/10* (2006.01)
*E02B 7/00* (2006.01)

(52) U.S. Cl.
CPC ............... *E02B 3/108* (2013.01); *E02B 7/00* (2013.01)

(58) Field of Classification Search
CPC .................................. E02B 3/108; E02B 7/00
USPC .................................................. 405/107–117
See application file for complete search history.

(56) References Cited

U.S. PATENT DOCUMENTS

| | | | | |
|---|---|---|---|---|
| 565,019 | A * | 8/1896 | Newburg | E02B 3/108 405/114 |
| 3,237,414 | A * | 3/1966 | Straub | E02B 3/062 405/26 |
| 3,476,246 | A * | 11/1969 | Dahan | E02B 15/06 210/776 |
| 3,638,429 | A * | 2/1972 | Sladek | E02B 15/08 405/63 |
| 3,653,213 | A * | 4/1972 | Childers | E02B 15/08 405/63 |
| 3,744,253 | A * | 7/1973 | Williams | E02B 15/08 405/66 |
| 3,798,911 | A * | 3/1974 | Oberg | E02B 15/08 405/69 |
| 4,116,007 | A * | 9/1978 | Stagemeyer | E02B 15/048 405/66 |
| 4,136,995 | A | 1/1979 | Fish | |
| 4,146,344 | A * | 3/1979 | Steen | E02B 15/08 405/68 |
| 4,252,461 | A * | 2/1981 | Colamussi | E02B 7/005 405/115 |
| 4,319,858 | A * | 3/1982 | Jaffrennou | E02B 15/06 405/68 |
| 4,330,223 | A * | 5/1982 | Webb | E02B 15/08 405/63 |
| 4,507,017 | A * | 3/1985 | Magoon | E02B 15/08 405/66 |
| 4,692,060 | A | 9/1987 | Jackson | |
| 4,921,373 | A * | 5/1990 | Coffey | E02B 3/108 256/13 |

(Continued)

*Primary Examiner* — Benjamin F Fiorello
*Assistant Examiner* — Edwin J Toledo-Duran

(57) ABSTRACT

A bottom boom and method of use is disclosed for containing heavy or sinking oils which migrate on an underwater floor. The bottom boom is comprised of an upper wall, a lower wall that abuts an underwater floor, a support structure and a ballast section. The upper wall and lower wall when properly supported by support structure provides an upright barrier to guide or stop heavy non-floating oils on an underwater floor. The support structure is a series of chambers, longitudinally spaced between the upper and lower walls of the bottom boom, such that when each chamber is filled with water the chambers vertically support the upper wall at an angle above the lower wall and horizontally maintain the lower walls width thus forming said upright barrier. Additionally the chambers can be filled with air to expedite recovery of bottom boom from underwater floor.

8 Claims, 5 Drawing Sheets

(56) References Cited

U.S. PATENT DOCUMENTS

| | | | |
|---|---|---|---|
| 5,039,250 A | 8/1991 | Janz | |
| 5,040,919 A | 8/1991 | Hendrix | |
| 5,478,168 A * | 12/1995 | Carr | E02B 15/06 405/68 |
| 5,480,262 A * | 1/1996 | Russo, III | E02B 15/08 405/66 |
| 5,688,075 A * | 11/1997 | Gradek | E02B 15/06 405/63 |
| 5,984,577 A * | 11/1999 | Strong | E02B 3/108 405/114 |
| 6,024,145 A * | 2/2000 | Ackles | A01G 23/08 144/336 |
| 6,164,870 A | 12/2000 | Baruh | |
| 6,672,799 B2 | 1/2004 | Earl | |
| 6,692,188 B1 | 2/2004 | Walker | |
| 6,743,367 B2 * | 6/2004 | Dreyer | E02B 15/08 210/170.05 |
| 8,844,114 B2 * | 9/2014 | Butterfield | E05D 5/14 29/525.01 |
| 8,915,673 B1 * | 12/2014 | Taquino | E02B 15/0814 405/71 |
| 10,024,014 B1 * | 7/2018 | Carter | E02B 15/0814 |
| D852,317 S * | 6/2019 | Shany | D23/200 |
| D858,689 S * | 9/2019 | Shany | D23/200 |
| 10,544,558 B2 * | 1/2020 | Shany | E02B 15/0807 |
| 2001/0048851 A1 * | 12/2001 | Dreyer | E02B 15/08 405/63 |
| 2002/0018695 A1 * | 2/2002 | Johnson | E02B 15/0814 405/60 |
| 2003/0072618 A1 * | 4/2003 | Tang | E02B 3/108 405/115 |
| 2007/0217868 A1 * | 9/2007 | Beidle | E02B 3/06 405/115 |
| 2007/0243021 A1 * | 10/2007 | Tyler | E02B 3/108 405/114 |
| 2008/0253838 A1 * | 10/2008 | Salemie | E02B 3/108 405/116 |
| 2009/0041543 A1 | 2/2009 | Kroger | |

\* cited by examiner

BOTTOM BOOM

BACKGROUND AND PRIOR ART

There exists certain heavy oils such as Diluted bitumen (dilbit), some Fuel Oils, and Asphalt among others, which are separately classified by the US Coast Guard and the Spill Response Community as "Nonfloating", Group V, or Sinking Oils due to the specific characteristic that they often sink in water. Weathering and other environmental conditions can cause many lighter oils to degrade, lose the lighter components and submerge as well. Traditional and current oil spill containment and protection techniques have been focused on floating oil—the oil that you can see. Using floating booms, responders have met with considerable success in containing, directing, and removing spilled oil on rivers, coastlines and seaways. Used in a protection mode, these floating booms have been highly effective in defending ecologically and/or economically valuable and sensitive areas. These containment and protection booms have become the response community's most effective tool in containing and mitigating the damaging effects of floating oil spills but have been useless in impeding, recovering, or directing the migration of the heavier, sinking oils.

There has been much work in the art of oil containment booms, all of which though are purely designed to float on top of the water to contain and/or collect oil that is floating upon the surface of the water. These past inventions use highly flexible but impermeable fabrics like urethane and PVC coated nylon or poly scrim fabrics together with adsorbent or absorbent materials to contain and collect floating oil. These past inventions lack the ability to contain heavy oils in deep waters due to their inability to create and maintain an oil impermeable seal with the underwater floor.

Some variations of floating ballasted fencing has been used to attempt to seal against the seafloor, but the fence geometry of such devices extends from the water surface to the underwater floor thus causing huge tidal and current forces to be applied against the fence. These hanging fences are subject to tidal flow, wave propagation and/or river currents due to the positioning of their buoy system which allow them to lift and sway thus failing to create an impenetrable underwater floor seal. The present invention overcomes this shortcoming.

Other mobile fencing mechanisms have been used to fully prevent silt or fluid from passing—acting as flood barriers, dams, silt screens or the like. These past inventions use traditional dry land engineered fencing support structures to build and maintain the barrier prior to flooding, Additionally some of these past inventions have used dredged holes that the fabric is buried in to create a seal prior to water flowing toward the fence. These past inventions lack the ability to be easily installed and removed on an underwater floor.

SUMMARY OF THE INVENTION

The invention proposed here is a bottom boom, which overcomes the prior arts shortcomings and provides a solution to properly contain migrating "Nonfloating", group V, or sinking oils. As with floating containment booms, responders can use bottom booms to contain spilled oil in a proximate location, and prevent migration of submerged oil from impacting nearby sensitive environments or other commercial interests. In a scenario where submerged oil is migrating, as in rivers or harbor channels or along a coastal current, bottom booms can be placed to protect sensitive areas and deflect the oil into planned recovery locations. As with floating booms, this allows responders to use currents and the intrinsic heavy oil properties to aid in the spilled oil recovery and in protecting valued ecological and commercial assets.

The bottom boom is designed to provide an effective seal with the underwater floor and a barrier to contain and redirect submerged oil for concentration and recovery. Bottom booms are made using highly flexible but impermeable fabrics like the urethane and PVC coated nylon or poly scrim fabrics used in the manufacture of floating containment booms. Portions of the bottom boom can also contain or be composed of adsorbent or absorbent water permeable materials to aide in the containment of spills and continuously work in heavy current flow situations.

The bottom boom works in two planes to contain and redirect submerged oil. A lower wall ballasted by chain pockets hugs the contours of the underwater floor. An upper wall is joined to the lower wall with an impermeable seam at a main chain ballast pocket. A support structure between the upper wall and lower wall provides the vertical support needed to keep the upper wall in an upright position thus providing a barrier on the underwater floor. The support structure is a plurality of fillable chambers and the main component of this invention. The support structure is a novel addition to the current art, it minimizes the negative effects of currents, tidal water flow and buoyancy providing the most effective seal against the underwater floor by using the physical properties of water to vertically and horizontally support the bottom boom at any depth underwater in an upright V shaped barrier. The bottom boom can be deployed in harbors, bays, open seabeds or any other underwater floor.

The dimensions of the lower wall and upper wall can vary depending on the local underwater geography but roughly a meter to two meters of coated fabrics in each of the upper and lower walls widths is a good median dimension. Bottom booms can be diver-deployed in ten-twenty meter long sections that can be placed individually in overlapping chevron patterns to direct submerged oil flow or can be linked together to form a continuous subsea barrier to isolate and contain sunken oil at docks, harbors, bays, berths, river sections, vessel grounding wrecks, pipeline break locations or any other underwater floor. There is no restriction on the size or length of the bottom boom, the above are rough estimates on commonly useable sizes.

The linking mechanisms are well known in the art and can be composed of snaps, hook and loop fasteners, overlapping clamps, zippers, tied grommets, heat sealing, IR welding, adhesives, or any combination thereof. In a preferred embodiment linking flaps containing grommets on end sides of a bottom boom section are folded then zip tied or tied together.

Bottom booms can be deployed by divers off a dock or jetty or by divers off a boat in much longer sections to expedite deployment and recovery for larger spill containment. The deployment off a boat can be done without divers by dropping the bottom boom with chambers filled before entering the water and reeling out the boom, the ballasts are designed to drop the bottom boom in an arrow like fashion toward the underwater floor having a rear edge the heaviest and landing first, the leading edge landing second being the next heaviest ballast thus settling the lower wall against the underwater floor creating a double seal and forming the upright barrier. The overall structure and support for the bottom boom is identical for either type of deployment and contain the same inventive concept. That inventive concept being a mobile, fully submerged bottom boom that works in two planes to contain and redirect heavy or sinking oils along an underwater floor using a water fillable support structure to form and support the barrier vertically and horizontally. The chambers are fillable and drainable, in some cases plumbing and valves are included and attached to the bottom boom to allow filling and draining of the chambers from a remote location. This allows the bottom boom to more easily be placed and removed when used in harbors or rivers, allowing workers to fill the chambers partially with air to float haul them into place and then filling chambers with water via connected plumbing to submerge the bottom boom more rapidly into place on the underwater floor.

The support structure in the preferred embodiment is a plurality of chambers that are tetrahedral in shape, wherein portions of the upper wall and lower wall form two of the four sides of each chamber, the other two sides can be formed by IR welding fabric to the upper and lower walls making a chamber that is impermeably sealed and fillable and drainable by use of valves. When the chambers are filled with water, they form a support structure that vertically and horizontally supports the upper wall relative to the lower wall to form an upright barrier. The bottom boom can be fully submerged underwater and abut the seabed thus allowing tidal flow and current flow to pass over the bottom boom while trapping heavy sunken oil at the barrier. The object of the present invention is to provide an easily submergible and easily retrievable barrier that uses the physical properties of water to aid in the deployment of the bottom boom and support of the bottom boom. The same support structure chambers can be filled with air when on the seabed to float the bottom boom and expedite retrieval of the bottom boom.

The support structure is comprised of a plurality of fillable chambers, each boom has a number of chambers N which depend on the length W of the boom and the width U and L of each of the upper (U) and lower (L) walls. In one embodiment the widths U and L are equal in magnitude, in other embodiments U is wider than L, in a non pictured but inclusive embodiment U is narrower than L. It can be generally accepted that U and L do not need to be equal but can vary for specific underwater locations or for ease of manufacture and transport. In one embodiment there is a 15-30 cm gap between adjacent chambers at a rear edge of the boom, a gap roughly 5-30 cm between the outermost chamber and longitudinal edge of the boom, a gap roughly 5-30 cm between the top and front vertex of each chamber and a rope pocket and front chain ballast pocket to account for heat welding. In these heat welded sections, it is commonly practiced to punch grommet holes since the double layer is more supportive. It is within the scope of the present invention to include holes, grommet holes and/or grommet flaps in these heat welded sections especially along the leading ballast pocket, rope pocket and longitudinal edges, in order to connect adjacent bottom booms, stake the lower wall in high current situations, and/or attach buoys to account for extreme bathymetry locations.

It can be generally accepted that heat welding/IR welding additional sheets of fabric to form the chambers, ballast pockets, rope pockets, grommet flaps, buoy grommets, buoy pockets or any other obvious addition well known in the art is within the scope of the present invention. The method of manufacture can be varied in the process of when each weld is formed to create the chambers and pockets since manufacturing booms is common practice and origami of geometric shapes is a well known art. It may be preferred to use a single sheet of fabric and make a first fold to form the upper and lower walls then heat welding a main chain ballast pocket at the fold, then looping the fabric at an upper end of the upper wall and heat welding to form the rope pocket, then looping the fabric at the front end of the lower wall and heat welding to form the leading chain ballast pocket, these naturally could take place in any order since the weld locations do not interfere. It may be then preferred to use a smaller geometrically cut piece of fabric as the front walls of the chambers and heat weld them onto the upper and lower walls making impermeable chambers. It may then be preferred to place valves on the back side of the upper wall located at the chambers to allow filling and draining of said chambers. It may be easier in some instances to fully weld the chamber free standing and attach valves then weld it into place between the upper and lower walls. It may be preferred to place the chain ballasts and haul rope at their respective pocket locations then weld the pockets around the chains and rope, especially in the case where buoys are strung along the haul rope. It may be preferred to use heat welds in a different arrangement than explicitly disclosed in order to further support the bottom boom in any way for structural integrity or ease of manufacture or transport.

The chambers can be shaped as any geometric shape, however for structural reasons as well as ease of manufacture a tetrahedral shape for each chamber is ideal. The shape of each chamber could be a regular tetrahedron, with evenly spaced gaps between each chamber to provide consistent vertical support along the entire length of the bottom boom. In another embodiment the chambers shape is a right tetrahedron. The chambers could also be shaped as triangular prisms, or spaced unequally, especially at the ends of each boom section so as to more effectively vertically support the upper wall. The chambers could be other geometric shapes. Additionally, buoys commonly used in the art could be used near ends of the bottom boom and/or along the top end of the upper wall in between each chamber in order to prevent sagging of the upper wall along varied underwater floor bathymetries. Buoyant sections of the pneumatic variety as disclosed in U.S. Pat. No. 10,024,014 granted to Carter et al. are fully incorporated as an option for buoy pockets.

The present invention is designed specifically to enable ease of deployment, in a preferred embodiment a main chain ballast is more massive per foot than a leading chain ballast. The main chain ballast is located at a lower rear edge of the bottom boom, and runs longitudinally along the lower rear edge, thus allowing the rear edge of the lower wall to firmly rest upon the seabed. In this embodiment wherein the main chain ballast is the densest portion of the bottom boom, the main chain ballast will intrinsically fall through the water during deployment as the lower most point of the bottom boom allowing a hydrodynamically favorable form during deployment. Additionally upon recovery, the chambers can be filled at least partially with air to float the bottom boom back to the surface for a more efficient retrieval.

The present invention will be disclosed in a detailed description below, the Drawings and words used to describe the invention below are not limiting and only used to explain the inventive concept in great detail including additional features and embodiments that are not necessary for every bottom boom installation location. Other embodiments are not disclosed for brevity and it should be generally accepted that any obvious variation of the present inventions design is within the scope of the present invention.

DETAILED DESCRIPTION OF THE PREFERRED EMBODIMENTS

Figure 1:
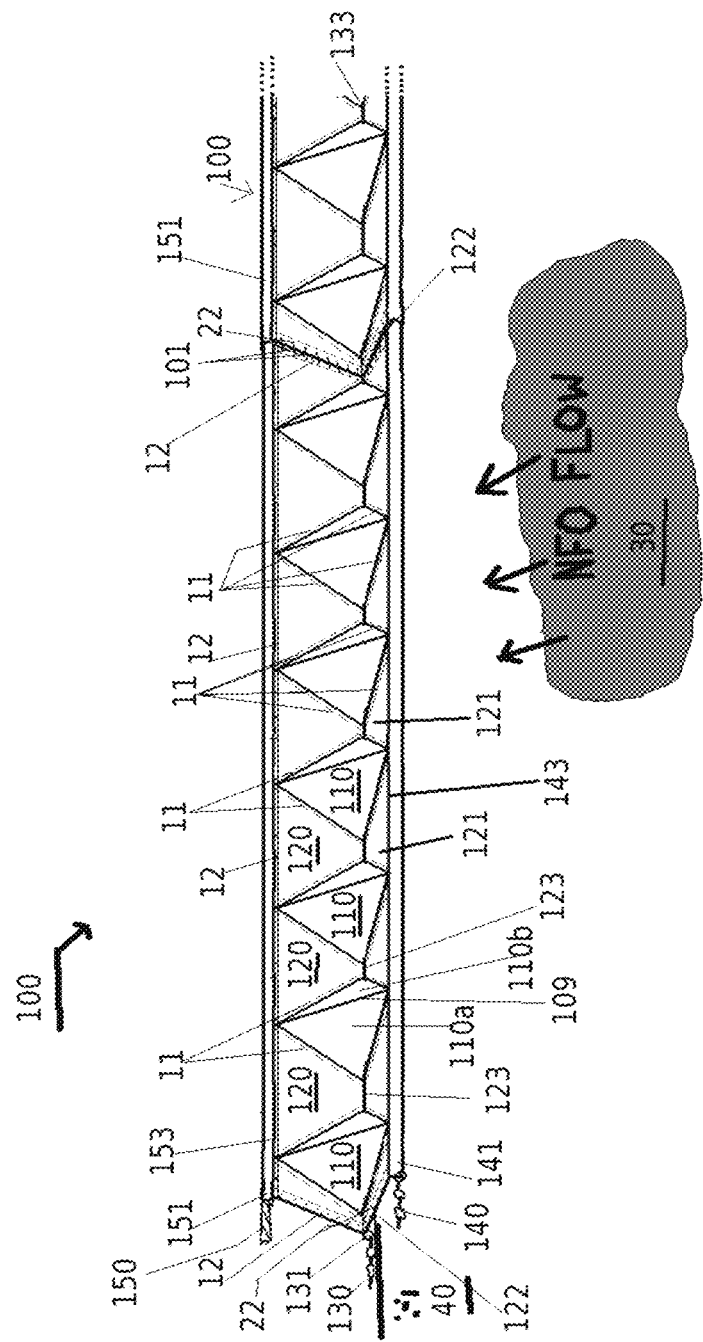
FIG. 1 is a full size front view depiction of the bottom boom abutting an underwater floor attached to an adjacent bottom boom and in the path of a non floating oil (NFO) flow.
Figure 3:
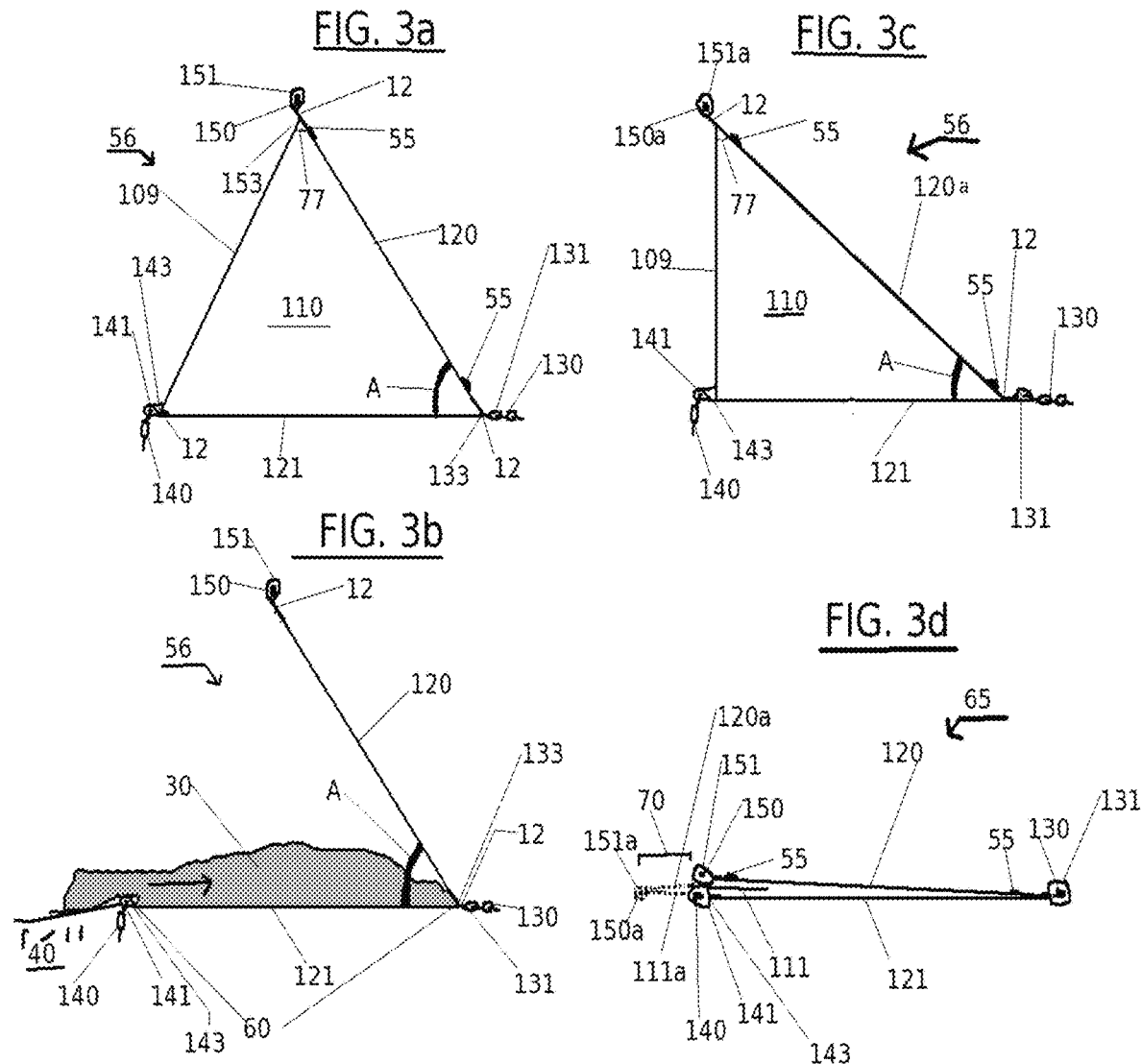
FIG. 3a is a cross sectional view as seen in FIG. 2 to show the support structures shape.
FIG. 3b is a cross sectional to show the bottom boom functioning as a seal and barrier in two planes with NFO collecting as designed.
FIG. 3c is a cross sectional view as seen in FIG. 2 to show the support structures shape in a separate embodiment wherein the upper wall is wider than the lower wall.
FIG. 3d is a cross sectional view when the chambers are empty and the bottom boom is folded for reeling or transport, an asymmetrical embodiment is shown in dashes.

Referring to FIG. 1, a bottom boom 100 is pictured abutting an underwater floor 40 in the direct path of NFO flow 30. The bottom boom 100 comprises a plurality of chambers 110 formed by heat welding 11 a plurality of chamber walls 110a-b between an upper wall 120 and a lower wall 121, a main chain ballast 130 that resides within a main chain ballast pocket 131 located at a lower rear edge 132, and a leading chain ballast 140 that resides in a leading chain ballast pocket 141 located at a front edge 143 of the lower wall 121. A haul rope 150 resides in a rope pocket 151 at an upper edge 153 of the upper wall 120. The chamber walls 110a-b, the upper wall 120 and lower wall 121 are preferably composed of an impermeable poly coated fabric such as urethane or PVC coated nylon. The main chain ballast 130 and leading chain ballast are preferably made of a metal chain as is commonly used in the art, it is an object of this invention to provide a more dense main chain ballast 130 than leading chain ballast 140 in order to create a hydrodynamically efficient form of the bottom boom 100 when sinking to an underwater floor 40. This form is generally triangular in shape with the upper wall 120 and lower wall 121 facing partially downward with the main chain ballast 130 the lower most point of the triangular cross section. Upon deployment when the chambers 110 are filled and after the main chain ballast 130 abuts the underwater floor 40 intrinsically the leading chain ballast 140 will sink to the underwater floor 40 thus creating a double seal 60 as seen in FIG. 3b.

Each chamber 110 is formed using a plurality of structural heat welds 11, the plurality of structural heat welds 11 and chambers 110 define a structural support after the chambers 110 are filled with water. The structural support provides vertical support to maintain upper wall 120 at an acute angle A above the lower wall 121, horizontal support to maintain the lower wall 121 flat and at full width, wherein the upper wall 120 and lower wall 121 are impenetrably sealed at the lower rear edge 133, thus forming an upright barrier 56 and a double seal 60 with the underwater floor 40 preventing NFO flow 30 from migrating beyond the lower rear edge 133 (as seen in FIG. 3b). The leading chain ballast 140 and main chain ballast 130 maintain the double seal 60 with the underwater floor by forcing the leading chain ballast pocket 141 and main chain ballast pocket 131 to firmly rest upon the underwater floor 40. The chambers 110 being filled with water provide no buoyant force so the effective seal of the ballasts is unmatched compared to prior art.

Each chamber 110 is spaced from adjacent chambers 110 a gap 123 at the lower rear edge 133 of the bottom boom 100. The gaps 123 can vary in size or be equal for each bottom boom 100, for example the gaps 123 could be roughly 5-30 cm. The gaps 123 help in manufacture to allow ample room to perform structural heat welds 11 and to allow enough flexibility of the lower wall 121 to contour to any under water floor 40 bathymetry. The number of chambers 110 per bottom boom 100 can vary, as shown in FIG. 1 seven chambers 110 fit evenly spaced along a 10m long bottom boom, the upper wall 120 and lower wall 121 are each roughly a meter wide and 10 m long. Additional functional heat welds 12, can be formed on longitudinal ends 122 of the upper wall 120 and lower wall 121. The functional heat welds 12 provide ample fabric and strength to place a plurality of grommets 22 which allow linking of more than one bottom boom 100 at longitudinal ends 122 via links 101. Functional welds 12 can also form the main chain ballast pocket 131, the leading chain ballast pocket 141 and the rope pocket 151.

Figure 2:
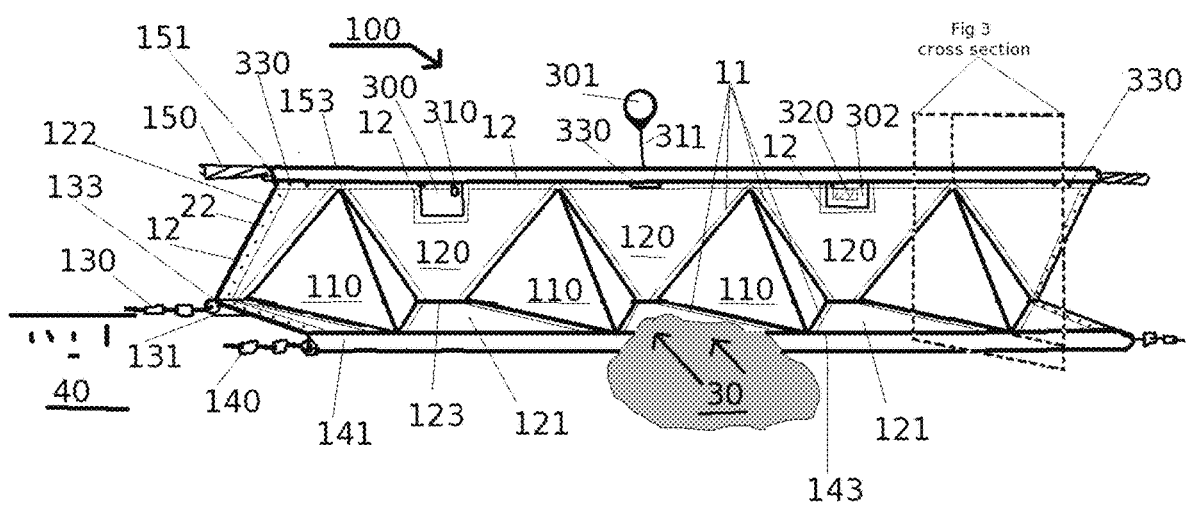
FIG. 2 is a zoomed in front view of the bottom boom with NFO collecting on the lower wall as desired as well as shows different embodiments for buoys.

Referring to FIG. 2, a slightly different embodiment is shown as bottom boom 100, wherein the chambers 110 are identical, and located between upper wall 120 and lower wall 121, formed by structural heat welds 11 and spaced from each other by a gap 123. Also identically the main chain ballast 130 resides in the main chain ballast pocket 131 at the lower rear edge 133, the leading chain ballast 140 resides in leading chain ballast pocket 141 located at a front edge 143, and the haul rope 150 resides in the rope pocket 151 at the upper edge 153 of upper wall 120. The chambers 110 when filled with water provide vertical support to hold upper wall 120 at an acute angle A above lower wall 121, horizontal support to the lower wall 121 keeping it flat at full width, wherein the upper wall 120 and lower wall 121 are impenetrably sealed at the lower rear edge 133, thus forming an upright barrier 56 and a double seal 60 (as seen in FIG. 3b) with the underwater floor 40 preventing NFO flow 30 from migrating beyond the lower rear edge 133.

Figure 4:
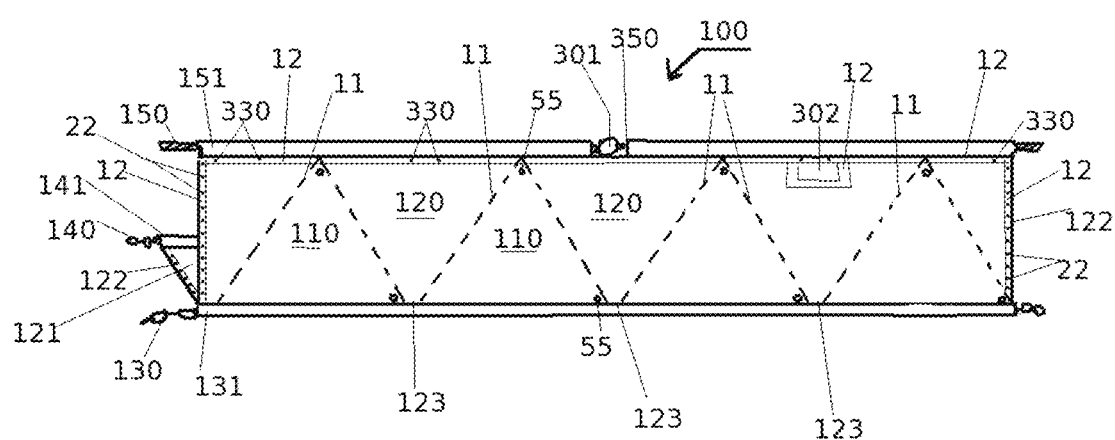
FIG. 4 is a view of FIG. 2 from behind the bottom boom to show valves and relative locations of chambers.

Also shown in FIG. 2 are buoys 300, 301, 302, each is a different variation of commonly used buoys, 300 is a pneumatic buoy pocket with air valve 310, 301 is an incompressible buoy attached by rope 311 via buoy grommets 330, and 302 is a buoy pocket that accepts incompressible buoys 320 designed to fit in said buoy pocket 302. The buoy pockets 300 and 302 can be formed by using functional heat welds 12, additionally buoy grommets 330 can be arranged in any functional heat weld 12 to allow connection of buoys 301 along the upper edge 153, good longitudinal locations for such buoy grommets 330 are directly between chambers 110 and/or near the longitudinal end 122 at the upper edge 153 of upper wall 120. The purpose for providing buoys 300-302 is to prevent sagging of rope 150 between the chambers 110 and near the ends of each bottom boom 100. Buoys 300-302 are not necessary but can be subjectively used at any underwater bathymetry where sagging should be corrected, such as low points along the underwater floor 40 wherein the upper edge 153 would naturally want to fold. Additionally the buoys 301 could be any shape commonly used and could be directly attached to the haul rope 150 and be located inside rope pocket 151, or have buoy holes 350 cut in the rope pocket 151 to allow buoys 301 to be attached directly to rope 150 as seen in FIG. 4.

Referring to FIGS. 3a, 3c, these are cross sectional areas of the bottom boom 100 as shown in FIG. 2. Specifically FIG. 3a is the cross sectional area of the boom 100 where the chamber 110 is largest, FIG. 3b is the cross sectional area within the gap 123 between chambers 110, FIG. 3c is a slightly different embodiment showing asymmetric widths of upper wall 120 and lower wall 121 wherein the chamber 110 is shaped more like a right tetrahedron than the regular tetrahedral shape as shown in FIGS. 3a and 3b. FIG. 3d shows a folded barrier 65, wherein the chambers 110 are empty and the haul rope 150 is folded toward the front edge 143. As can be seen a chamber fold 111 is wrinkled between upper wall 120 and lower wall 121, this can prevent proper storage so it is also an object of the present invention to minimize the chamber fold 111. In the embodiment of FIG. 3c the upper wall 120 is wider than lower wall 121, thus as seen in FIG. 3d a haul rope 150a is able to fold past leading chain ballast 140 a distance 70 thus minimizing chamber fold 111a and the stacking height of the bottom boom 100.

Referring to FIG. 3a we see the bottom boom 100 in the upright barrier 56 position, valves 55 are shown on the backside of upper wall 120 near the upper edge 153 and lower rear edge 133. Valves 55 should be placed to allow complete filling and draining of chambers 110 and have an open and closed position, shown is a full water level 77 which provides vertical support to hold upper wall 120 at an acute angle A above lower wall 121. The valves 55 can have an over pressurization mechanism, thus allowing the chamber 110 to partially drain to balance chamber pressure. It is also common to have one valve open while filling from the other valve thus allowing draining if over pressurized. When chambers 110 are full a vertical edge 109 of each chamber 110 is generated. The functional welds 12 can be clearly seen forming the haul rope pocket 151, the main chain ballast pocket 131 and the leading chain ballast pocket 141.

Referring to FIG. 3b we see the NFO flow 30 has migrated along the underwater floor 40 over the front edge 143 on top of lower wall 121 and to the lower rear edge 133 of the bottom boom 100, this further strengthens the double seal 60 by adding weight on top of the lower wall 121 as more NFO flow 30 gathers into the upright barrier 56. The specific design of the bottom boom 100 having the upper wall 120 at the acute angle A above lower wall 121 as shown provides the upright barrier 56 with the most effective double seal 60 since as the NFO flow 30 loads onto the lower wall 121 the upper wall 121 maintains the center of mass of the NFO flow 30 either right in the middle below the haul rope 150 or closer to the front edge 143 than the lower rear edge 133 thus deterring the upright barrier 56 from toppling or lifting the front edge 143 from the underwater floor 40. In addition to the upright barriers 56 intrinsic geometrical design to maintain NFO flow 30, its novelty resides in the design of the zero buoyancy of water filled 77 chambers 110 formed purely of fabric and structural heat welds 11 to fully support the upper wall 120 at an acute angle A to the lower wall 121, and the negative buoyancy of the main chain ballast 130 and leading chain ballast 140 thus easily maintaining the upright barrier 56 at the underwater floor 40.

Referring to FIG. 3c we see chamber 110 has a full water level 77 which vertically supports upper wall 120 at an acute angle A above lower wall 121, thus forming an upright barrier 56. This embodiment shows a haul rope 150a and rope pocket 151a at the upper edge 153 of the upper wall 120 so that the dashed depiction of this embodiment in FIG. 3d is more easily understood. As can bee seen the upper wall 120 is wider than the lower wall 121, this helps folding of the bottom boom 100 into a flatter ribbon to be stored as well as provides slightly different structural support that could be desired for the bottom boom 100 at different underwater locations.

Referring to FIG. 3d we see the bottom boom 100 is a folded barrier 65 for easy storage and transport. There are two embodiments in this Figure, the dashed lines represent the embodiment of FIG. 3c, and the solid lines show the embodiment of FIG. 3a. We see the upper wall 120 of FIG. 3c is wider by a distance 70. This distance 70 can vary subjectively for the specific underwater location. The distance 70 could also be in the opposite direction, meaning that the upper wall 120 is not as wide as lower wall 121 still offsetting the haul rope 150 and leading chain ballast 140 so they are not stacked directly on top of each other in the folded barrier position 65. The chamber fold 111 should be minimized when possible to make storage more efficient, in the embodiment of FIG. 3c we see the chamber fold 111a as being minimized. Another way to minimize chamber fold 111 is to have the upper wall 120 be not was wide as the lower wall 121. In another embodiment having the chamber 110 not extend all the way to the leading edge 143 would minimize the chamber fold 111.

Referring to FIG. 4 we see a back view of the bottom boom 100, wherein the dashed lines represent the locations of structural welds 11 forming chambers 110 spaced from each other the gap 123. Valves 55 can be located near the top corner of chambers 110 and/or at the bottom corner of chambers 110 so as to allow complete filling and draining. The valves 55 can be of any variety useful in the art to allow or block water and/or air, allow water and block air, allow air and block water or any combination of advanced valve known in the art or invented in the future. Buoy grommets 330 are shown along the functional weld 12 along the rope pocket 151, additionally buoy pocket 302 is shown on the backside of upper wall 120 formed by functional welds 12. Buoy hole 350 is shown to allow room for attaching incompressible buoy 301 directly to haul rope 150. In other embodiments the rope pocket 151 is large enough to accommodate incompressible buoys 301 strung onto haul rope 150. Grommets 22 are shown along longitudinal edges 122 in functional welds 12. It is within the scope of the present invention but not pictured to have varying widths of upper wall 120 and lower wall 121 in one bottom boom 100, as well as varying size chambers 110 to account for the different upper wall 120 and lower wall 121 dimensions thus providing consumer with a bottom boom 100 that contours an underwater bathymetry but the upper edge 153 is a consistent depth beneath the water surface.

Figure 5:
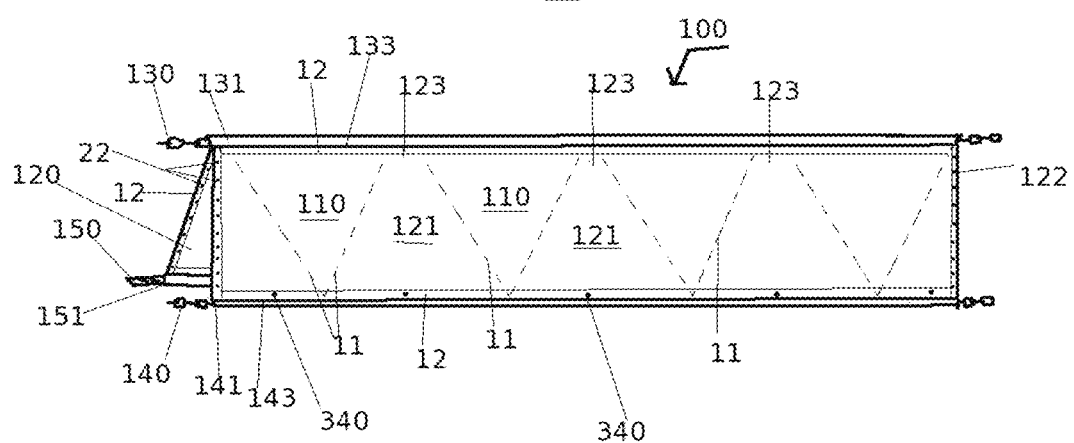
FIG. 5 is a view of FIG. 2 from below the bottom boom, showing general heat weld locations and relative locations of chambers.

Referring to FIG. 5 we see a bottom view of the bottom boom 100, wherein the dashed lines show locations for structural welds 11 defining the chambers 110 separated by the gaps 123. The functional welds 12 can have stake holes 340 especially near the leading edge 143 as pictured. The stake holes 340 will allow users to stake the bottom boom 100 to the underwater floor 40 to keep the barrier in place during high current situations. In some figures the bottom boom 100 is shown to only have four chambers 110, it is obvious that the number and spacing of chambers 110 can change for specific underwater locations or for different width, height and length dimensions of the bottom boom 100. In the preferred embodiment the chambers 110 extend almost the entire width of the upper wall 120 and lower wall 121, leaving room only for heat welds 11, 12. IN other embodiments the chambers 110 can extend only partially along the width of the upper wall 120 and lower wall 121.

It should be known that the term heat weld generally means IR welding but is not limited to only IR welding or heat welding in general, the structural welds 11 and/or functional welds 12 can instead be formed using adhesives, sewing or any other commonly practiced fabric bonding techniques in the art. Additionally stiffeners such as multiple layers of IR welds, batons, multiple layers of fabric, adhesives or the like could be used at any structural weld 11 or functional weld 12 to provide additional sturdiness to joints, seams and edges. In a preferred embodiment each structural weld 11 is at least two pieces of fabric thick for the entire length and width of the weld to impermeably form the chambers 110. The structural welds 11 defining the filled chambers 110 base on the lower wall 121 provide horizontal support for the lower wall 121 maintaining its full width along the entire length of the bottom boom 100, preventing folding, wrinkling or other undesirable dispositions on the under water floor 40 thus providing the best double seal 60 possible.

The filling of chambers 110 to the full water level 77 provide a fully expanded bottom boom 100 that is supported both vertically and horizontally by the intrinsic shape of the chamber 110, that shape is preferably tetrahedral but can be any geometric shape to account for manufacturing needs, consumer needs, and/or special underwater bathymetries. Some possible shapes for the chambers are triangular prism, square pyramid, cylindroid or the like. In the preferred embodiment each chamber 110 is a tetrahedron defined by the planes of the upper wall 120, the lower wall 121, and chamber walls 110$a$-$b$, wherein structural heat welds 11 are located at five of the six edges of the tetrahedron missing the vertical edge 109. In another embodiment structural heat welds 11 are located at all six edges of the chamber 110, another at four of the six edges, additionally in other embodiments or chamber shapes less structural welds 11 are possible. However for structural considerations the preferred embodiment is a tetrahedral chamber 110 with at least five of six edges defined by structural welds 11.

In the preferred embodiment for deployment the chambers 110 are filled to a full water level 77 at the surface of the water then sunken to an underwater floor 40, filling at the surface allows for a hydrodynamically favorable rigid triangular cross sectional shape of the bottom boom 100 as shown as the upright barrier 56 to more effectively fall to an underwater floor 40. Filling the chambers 110 maintains the proper widths of the upper wall 120 and lower wall 121 so the bottom boom 100 can settle upon the underwater floor 40 as an upright barrier 56 and instantly form a double seal 60 with the underwater floor 40 without the need for divers to stake anchors for horizontal support or fill chambers to provide vertical support. When the chambers 110 are filled to the full water level 77 they vertically and horizontally support the upper wall 120 at an acute angle A above the lower wall 121, thus forming an upright barrier 56 and double seal 60 with the underwater floor 40. In other embodiments the bottom boom 100 is sunken to the underwater floor 40 wherein the chambers 110 are filled by divers at the underwater floor 40 to the full water level 77 forming the upright barrier 56.

The haul rope 150 can be any standard poly-twine rope, rope, braid, cable or the like. It is generally used to aid in retrieval or anchoring the fence at the longitudinal end 122. In a preferred embodiment upon retrieval the chambers 110 are filled with air at the underwater floor 40 thus floating the bottom boom 100 making recovery more efficient. In a preferred embodiment the bottom boom 100 has a sinking force defined by the buoyant force of the bottom boom 100 when the chambers 110 are filled to the full water level 77 with water, and a recovery force defined by the buoyant force of the bottom boom 100 at an underwater floor 40 when the chambers 110 are filled with air. The magnitude of the forces are easily calculable using physical analysis and is proportional to the sum of the volume of chambers 110 and intrinsic density of materials used. In the preferred embodiment the sinking force is negative —meaning directed downwards- and the recovery force is positive— meaning directed upwards-. Additionally in the preferred embodiment the ratio of recovery forces magnitude to sinking forces magnitude is more than 700:1. In other preferred embodiments the ratio can be less substantial such as from the ratio of recovery force magnitude to sinking force magnitude being 700:1 to at least 2:1. These less substantial ratios of recovery force magnitude to sinking force magnitude are due to only filling the chambers 110 at the underwater floor 40 partially with air since that is all that is needed to quickly and efficiently recover the bottom boom 100 and allowing the rest of the water to drain from chambers 110 above water level.

It is within the scope of this invention to provide a method for preventing NFO flow 30 from migrating on an underwater floor 40 beyond an upright barrier 56 of a bottom boom 100, the method comprising: building a bottom boom 100 by providing an upper wall 120, providing a lower wall 121, impenetrably seal said upper wall 120 and said lower wall 121 to each other at a lower rear edge 133, forming a main chain ballast pocket 131 at said lower rear edge 133, forming a rope pocket 151 at an upper edge 153 of the upper wall 120, forming a leading chain ballast pocket 141 at a front edge 143 of the lower wall 121, provide chamber walls 110$a$-$b$ to form a plurality of chambers 110 between the upper wall 120 and lower wall 121 by forming structure welds 11 at intersecting edges of chamber walls 110$a$-$b$ and the upper and the lower walls 120-121, providing valves 55 to allow complete filling and draining of chambers 110, providing a main chain ballast 130 in the main chain ballast pocket 131, providing a leading chain ballast 140 in the leading chain ballast pocket 141, providing a haul rope 150 in the rope pocket 151; filling the chambers 110 completely with water 77 to form an upright barrier 56, deploying upright barrier 56 so it sinks to an underwater floor 40 in direct way of NFO flow 30, retrieving NFO, filling chambers 110 at least partially with air through valves 55 so as to float the bottom boom 100 to the surface. It is to be understood the method of manufacture can vary depending on specific dimensions of bottom boom 100 being manufactured, the steps listed above to build the bottom boom can be done in many different orders and all are within the scope of the present invention. In general the forming of ballast pockets are done by heat welding. Additional steps include providing grommets 22 in functional heat welds 12 at longitudinal ends 122 of the bottom boom 100, providing multiple bottom booms 100 and connecting bottom booms 100 longitudinally via grommets 22 using links 101. Links 101 can be any form of fastener including but not limited to zip ties, rope, string, hooks, hook and loop fasteners, twist ties, bailing wire, and the like. Retrieving concentrated non-moving NFO is a well known art, commonly done and should be done before recovering the bottom boom 100. In small spill situations it is conceived that after the NFO flow 30 migrates completely onto the lower wall 121, the bottom boom 100 could be retrieved with the NFO 30 trapped in the upright barrier 56.

The chambers 110 can be composed of layers of fabric to add stability to larger sized bottom booms 100, however preferably chambers 110 are a single sheet of fabric with structural heat welds 11 formed by overlapping and heat welding at least two pieces of fabric. Additionally, in a preferred embodiment the chambers 110 are formed with all four walls and heat welded 11 together, then placed in between the upper wall 120 and lower wall 121 and heat welded 11 into place, this makes the sides against the upper wall 120 and lower wall 121 at least two pieces of fabric thick for added stability and support for the chambers 110. The widths of upper wall 120 and lower wall 121 can vary substantially if desired, this could drastically alter the symmetry of edge lengths for the tetrahedral chambers 110, however it is within the scope of the invention for the chambers 110 to not extend the entire width of lower wall 121. In this embodiment where the upper wall 120 is say a quarter of the width of the lower wall 121 the chambers 110 can still be roughly a regular tetrahedron, there would then exist a larger gap between the vertical edge 109 and the front edge 143, this would be useful with very rocky underwater floor 40 allowing ample room to bury the front edge 143 under rocks.

The valves 55 can additionally have plumbing built into the bottom boom 100 at upper edge 153 and lower edge 133 which are attached to a remote location to allow filling and draining of chambers 110 instantaneously from a distance. This allows users to partially fill chambers 110 with air to help float, move and situate the bottom boom 100 in place then instantaneously fill all chambers 110 with water thus expediting deployment of bottom boom 100 and containment of NFO flow 30. The plumbing should allow both air and water to fill and drain from the chambers 110, the plumbing could be placed along the functional welds 12 possibly in their own pockets formed by additional functional welds 12. It is to be understood that the plumbing can be used for boat deployment, diver deployment or off land deployment with any of the present inventions embodiments to expedite deployment and recovery.

During boat deployments it may be best to use a slide or roller on the edge of the boat for the bottom boom 100 to translate across so as to allow less stress forces on the bottom boom 100, the slide or roller helps with deployment when the chambers 110 are full 77 allowing easier movement of the heavy bottom boom 100. The slide can be of any typical design made from hard plastics, fiberglass, or metal are wide enough to fit the upright barrier 56, possibly having vertical edges to maintain the bottom boom 100 on the slide and long enough to allow ease of movement from reel or spool to the waters surface. The roller can be multiple rollers in a row such as a rolling conveyor, just a roller at the water end of a slide, a roller near the spool, or multiple rollers near the edge of the boat and near the spool. The rollers help assist translating of the bottom boom 100 across a boat deck, over the edge of a boat deck, and/or to flatten out and align to a spool, additionally rollers could be used at any location on the boat, dock or dry land location for translation purposes. The rollers could also be used to expedite draining of the chambers by forcibly squeezing the chambers upon exit of the water, or at any location on the boat, dock or dry land location. It is to be understood that rollers, slides and the like can be used in any common method to help deploy or retrieve any embodiment of the present invention, and could be critical during deployment from land or from a boat to minimize frictional forces from between the bottom boom 100 and any surface it must translate over.

The following list of claims are intended to protect the inventive concept in the most reasonable manner which encompasses the entire scope of the invention without departing from the inventive steps we took to provide the Bottom Boom disclosed by us and only us. The obvious variants from our disclosed designs are only overlooked to allow some brevity to the present specification and should be obvious for one of ordinary skill in the art after learning of our invention.

What we claim is:

1. A bottom boom comprising:
   an upper wall;
   a lower wall;
   a support structure defined by a plurality of chambers between the upper wall and lower wall;
   each chamber is fillable and drainable and when filled with water provide vertical and horizontal support to maintain the upper wall at an angle above the lower wall;
   further comprising a haul rope, a main chain ballast and a leading chain ballast; wherein the haul rope is located at an upper edge of the upper wall, the main chain ballast is at a lower rear edge of the upper wall and lower wall and the leading chain ballast is located at a front edge of the lower wall;
   further comprising a rope pocket for housing the haul rope, a main chain ballast pocket for housing the main chain ballast, a leading ballast pocket for housing leading chain ballast; wherein the rope pocket, the main chain ballast pocket and the leading ballast pocket are the same material as the upper and lower walls and formed by heat welding loops at the edges of the upper wall and lower wall;
   wherein the bottom boom sinks to an underwater floor to contain nonfloating oil.

2. The bottom boom of claim 1, wherein the volume of the chamber resembles a tetrahedron.

3. The bottom boom of claim 2, wherein the chamber is defined by structural heat welds at 4 of 6 edges.

4. The bottom boom of claim 2, wherein the chamber is defined by structural heat welds at 5 of 6 edges.

5. The bottom boom of claim 2, wherein the chamber is defined by structural heat welds at all 6 edges.

6. The bottom boom of claim 2, wherein the chamber is defined by heat welding edges of the tetrahedron making the chamber impenetrable, and valves are located on the upper wall to allow filling and draining of the chambers.

7. A method for preventing non floating oil from migrating on an underwater floor beyond an upright barrier, the method comprising:
   building a bottom boom by: providing an upper wall,
   providing a lower wall,
      impenetrably sealing said upper wall and said lower wall to each other at a lower rear edge,
      forming a main chain ballast pocket at said lower rear edge,
   providing a plurality of chamber walls to form a plurality of chambers between the upper wall and lower wall by forming structural welds at intersecting edges of chamber walls and the upper and the lower walls creating an impermeable chamber,
   attaching valves to allow complete filling and draining of chambers,
   providing a main chain ballast in the main chain ballast pocket,
   then filling the chambers completely with water to form an upright barrier, deploying upright barrier so it sinks to an underwater floor in direct way of nonfloating oil flow, retrieving nonfloating oil, filling chambers at least partially with air through valves so as to float the bottom boom to the surface.

8. A method for preventing non floating oil from migrating on an underwater floor beyond an upright barrier, the method comprising:
   building a bottom boom by: providing an upper wall, providing a lower wall,
      impenetrably sealing said upper wall and said lower wall to each other at a lower rear edge,
      forming a main chain ballast pocket at said lower rear edge, forming a rope pocket at an upper edge of the upper wall,
      forming a leading ballast pocket at a front edge of the lower wall,
      providing a plurality of chamber walls to form a plurality of chambers between the upper wall and lower wall by forming structural welds at intersecting edges of chamber walls and the upper and the lower walls creating an impermeable chamber,
   attaching valves to allow complete filling and draining of chambers,
   providing a main chain ballast in the main chain ballast pocket,
   providing a leading chain ballast in the leading ballast pocket,
   providing a haul rope in the rope pocket;
      then filling the chambers completely with water to form an upright barrier, deploying upright barrier so it sinks to an underwater floor in direct way of nonfloating oil flow, retrieving nonfloating oil, filling chambers at least partially with air through valves so as to float the bottom boom to the surface.

\* \* \* \* \*